(12) United States Patent
Mikura et al.

(10) Patent No.: US 9,457,617 B2
(45) Date of Patent: Oct. 4, 2016

(54) VEHICULAR WHEEL

(71) Applicant: HONDA MOTOR CO., LTD., Minato-Ku, Tokyo (JP)

(72) Inventors: Keita Mikura, Saitama (JP); Hidetoshi Toyoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 14/063,441

(22) Filed: Oct. 25, 2013

(65) Prior Publication Data
US 2014/0125114 A1  May 8, 2014

(30) Foreign Application Priority Data
Nov. 6, 2012 (JP) ................... 2012-244401

(51) Int. Cl.
*B60B 1/08* (2006.01)
(52) U.S. Cl.
CPC ............ *B60B 1/08* (2013.01); *B60B 2900/131* (2013.01); *B60B 2900/572* (2013.01); *B60Y 2200/12* (2013.01)
(58) Field of Classification Search
CPC .......... F16F 15/324; B60B 3/06; B60B 3/10; B60B 1/08
USPC ....................................... 301/5.21
See application file for complete search history.

(56) References Cited

U.S. PATENT DOCUMENTS 6,244,668 B1 * 6/2001 Hale et al. ............... 301/95.105
2011/0241415 A1 * 10/2011 Mikura .................... 301/64.102

FOREIGN PATENT DOCUMENTS

JP              4680729 B2      5/2011

* cited by examiner

*Primary Examiner* — Jeffrey J Restifo
*Assistant Examiner* — Erez Gurari
(74) *Attorney, Agent, or Firm* — Carrier Blackman & Associates, P.C.; William D. Blackman; Jeffrey T. Gedeon

(57) ABSTRACT

A vehicular wheel is formed by casting and includes a hub; a rim; and a plurality of spokes which extend toward the rim in the radial direction from the hub and are arranged in the circumferential direction. The wheel further includes connecting portions on an inner peripheral surface of the rim respectively connecting the plurality of spokes to the rim. Weight-mounting surfaces are formed at the center of the inner peripheral surface of the rim in the widthwise direction and arranged between respective connecting portions. The weight-mounting surfaces are formed so as to be substantially parallel to a rotational center line of the wheel. A molding seam which is formed at an interface between split faces of a wheel mold is arranged at a position spaced away from the weight-mounting surface in the widthwise direction.

13 Claims, 4 Drawing Sheets

VEHICULAR WHEEL

CROSS-REFERENCE TO RELATED APPLICATIONS

The present invention claims priority under 35 USC 119 based on Japanese patent application No. 2012-244401, filed on Nov. 6, 2012. The entire subject matter of this priority document, including specification claims and drawings thereof, is incorporated by reference herein.

BACKGROUND OF THE INVENTION

1. Field of the Invention

The present invention relates to a vehicular wheel. More particularly, the present invention relates to a wheel formed with a plurality of weight-mounting surfaces formed on a radially inwardly-facing circumferential surface thereof.

2. Background Art

It is common practice to balance wheels of vehicles by attaching weights to the rims of the vehicular wheels, such as for example, after changing tires. Japanese Patent No. 4680729 discloses a known system for mounting weights on a wheel rim in order to adjust the balance of the wheel. In such a conventional vehicular wheel, a balance-weight mounting portion is provided on a radially inwardly-facing circumferential surface of the wheel, the weight-mounting portion offset from the center of the wheel in the widthwise direction.

In order to position the center-of-gravity of a balance weight in the center of the wheel widthwise, a balance weight having an offset center-of-gravity in the widthwise direction is attached to the offset balance-weight mounting portion. The balance weight and the balance-weight mounting portion are configured such that the respective offsets compensate each other in the widthwise direction, thereby positioning the center-of-gravity of the weight at the widthwise center of the wheel.

Problem to be Solved by the Invention

However, in the vehicular wheel described in the Japanese Patent No. 4680729, the balance weight is mounted on the wheel by caulking. This has the drawback that a caulking mark remains on the wheel when the balance weight is removed from the wheel. Further, at the time of changing a tire, it is not always the case that the balance weight is mounted at the same position again. Accordingly, such a caulking mark can be seen from the outside of the wheel, adversely influencing the external appearance of the wheel.

SUMMARY OF THE INVENTION

The present invention has been made in view of the above-mentioned circumstances, and it is an object of the invention to provide a vehicular wheel where a balance weight can be mounted at the center of the wheel in the widthwise direction without employing caulking or other mounting means which could generate an objectionable visual appearance on the wheel.

Means for Solving the Problem

To achieve the above-mentioned object, a first aspect of the invention is characterized in that a vehicular wheel includes a hub; a rim; and a plurality of spokes which extend toward the rim in the radial direction from the hub and are arranged in the circumferential direction. The wheel is formed as an integral body by casting. The wheel includes a plurality of weight-mounting surfaces which are substantially parallel to a rotational center line of the wheel formed at the center of an inner peripheral surface of the rim in the widthwise direction. Each weight-mounting surface is arranged in between connecting portions of the plurality of spokes, where the spokes are respectively connected to the rim.

The first aspect is further characterized in that a molding seam, formed at an interface between split faces of a wheel mold used to cast the wheel, is spaced away from a central portion of each of the weight-mounting surfaces in the widthwise direction, such that an unobstructed area of each weight-mounting surface is provided to receive a weight thereon.

In addition to the first aspect hereof, a second aspect of the present invention is characterized in that an angle D of the weight-mounting surface is set to a range from 0.5° to 3° with respect to the rotational center line of the wheel.

In addition to the first aspect hereof, a third aspect of the present invention is characterized in that the inner peripheral surface further comprises a plurality of stepped portions disposed around an inner circumference thereof, which project inwardly in the radial direction, and wherein the weight-mounting surfaces are respectively formed at inner portions of a pair of opposing stepped portions and extend in the widthwise direction therebetween.

In addition to the second aspect hereof, a fourth aspect of the present invention is characterized in that the inner peripheral surface further comprises a plurality of stepped portions disposed around an inner circumference thereof, which project inwardly in the radial direction, and wherein the weight-mounting surfaces are respectively formed at inner portions of a pair of opposing stepped portions and extend in the widthwise direction therebetween.

In addition to the fourth aspect hereof, a fifth aspect of the present invention is characterized in that the molding seam is arranged proximate a side edge portion of the weight-mounting surface.

In addition to the fourth aspect hereof, a sixth aspect of the present invention is characterized in that the molding seam is arranged to be coincident with a side edge portion of the weight-mounting surface.

In addition to the first aspect hereof, a seventh aspect of the present invention is characterized in that the wheel is formed by high-pressure die casting.

In addition to the third aspect hereof, an eighth aspect of the present invention is characterized in that the wheel is formed by high-pressure die casting.

In addition to the fifth aspect hereof, a ninth aspect of the present invention is characterized in that the wheel is formed by high-pressure die casting.

A tenth aspect of the invention is characterized in that a vehicular wheel is formed as an integral body by casting and includes a hub; a rim; and a plurality of spokes which extend toward the rim in the radial direction from the hub and are arranged in the circumferential direction. The wheel includes weight-mounting surfaces formed at the center of an inner peripheral surface of the rim in the widthwise direction, and between adjacent spokes in the circumferential direction.

This aspect is further characterized in that a molding seam, formed at an interface between split faces of a wheel mold used to cast the wheel, is located at a position such that an unobstructed area of each weight-mounting surface is provided to receive a weight thereon.

In addition to the tenth aspect hereof, an eleventh aspect of the present invention is characterized in that the inner peripheral surface of the rim includes a plurality of connecting portions where the plurality of spokes are connected to the rim, and the weight-mounting surfaces are substantially parallel to a rotational center line of the wheel, and arranged between the connecting portions.

In addition to the tenth aspect hereof, an twelfth aspect of the present invention is characterized in that the wheel further includes a plurality of stepped portions, the plurality of stepped portions projecting inwardly in a radial direction from the inner peripheral surface of the rim. The weight-mounting surfaces are respectively formed at inner portions of a pair of opposing stepped portions and extend in the widthwise direction therebetween.

In addition to the twelfth aspect hereof, a thirteenth aspect of the present invention is characterized in that each of the plurality of stepped portions extends widthwise inwardly as it extends radially inwardly, and one of each pair of opposing stepped portions is longer than the other such that the weight-mounting surface extending between the pair of stepped portions is disposed at angle D with respect to the rotational center line of the wheel.

In addition to the thirteenth aspect hereof, a fourteenth aspect of the present invention is characterized in that the angle D is set to a range from 0.5° to 3°.

In addition to the tenth aspect hereof, a fifteenth aspect of the present invention is characterized in that the molding seam is arranged proximate a side edge portion of the weight-mounting surface.

In addition to the fourteenth aspect hereof, a sixteenth aspect of the present invention is characterized in that the molding seam is arranged proximate a side edge portion of the weight-mounting surface.

In addition to the tenth aspect hereof, a seventeenth aspect of the present invention is characterized in that the wheel is formed by high-pressure die casting.

In addition to the sixteenth aspect hereof, an eighteenth aspect of the present invention is characterized in that the wheel is formed by high-pressure die casting.

A nineteenth aspect of the invention is characterized in that a vehicular wheel includes a hub; a rim having an inner peripheral surface and a plurality of spokes which extend toward the rim in the radial direction from the hub and are arranged in the circumferential direction. The hub, the rim and the plurality of spokes are formed as an integral body by casting.

The wheel according to this aspect further includes connecting portions where the plurality of spokes are respectively connected to the inner peripheral surface of the rim; stepped portions projecting inwardly in a radial direction and inwardly in a widthwise direction from the inner peripheral surface of the rim; and weight-mounting surfaces formed at the center of the inner peripheral surface of the rim in the widthwise direction and extending between respective pairs of opposing stepped portions at an angle D to a rotational center line of the wheel.

The nineteenth aspect of the invention is further characterized in that the angle D is set to a range of 0.5° to 3°, and a molding seam formed at an interface between split faces of a wheel mold used to cast the wheel is arranged proximate a side edge portion of the weight-mounting surface, such that an unobstructed area of each weight-mounting surface is provided to receive a weight thereon.

Advantages of the Invention

According to the first aspect of the invention, weight-mounting surfaces which are substantially parallel to the rotational center line of the wheel are formed at the center of the inner peripheral surface of the rim in the widthwise direction. Each of the weight-mounting surfaces is arranged between the connecting portions of the plurality of spokes where the plurality of spokes are connected respectively to the rim. The molding seam which is formed at the interface of the split faces of the wheel mold during the molding process is arranged at a position spaced away from a central portion of each of the weight-mounting surfaces in the widthwise direction, such that an unobstructed area of each weight-mounting surface is provided to receive a weight thereon.

Due to such a configuration, the balance weight can be mounted on the weight-mounting surface arranged at the center of the rim in the widthwise direction. In this manner, the balance weight can be mounted in the widthwise center of the wheel without employing caulking or the like.

Further, according to the first aspect of the invention, because the molding seam is arranged at a position spaced away from the center of the weight-mounting surface, the central portion weight-mounting surface is not influenced by burrs which are liable to be generated at the molding seam. This allows a flat weight-mounting surface to be formed without cutting or the like.

According to the second aspect of the invention, the angle of the weight-mounting surface is set to a range of 0.5° to 3° with respect to the rotational center line of the wheel. In this manner, the weight-mounting surface is formed to be as parallel as possible to the rotational center line of the wheel while still ensuring a sufficient draft angle of the mold.

According to the third and fourth aspects of the invention, the stepped portions project inwardly in the radial direction and weight-mounting surfaces are respectively formed at inner portions of pairs of opposing stepped portions. In this manner, the weight-mounting surfaces can be visually recognized clearly as surfaces offset in a radial direction from the opposing inner peripheral rim portions, and an operator can easily adhere the balance weight to the center of the wheel in the widthwise direction.

According to the fifth aspect of the invention, the molding seam is arranged proximate a side edge portion of the weight-mounting surface, providing an unobstructed area in the widthwise center of the weight-mounting surface for receiving a weight thereon.

According to the sixth aspect of the invention, the molding seam is arranged to be coincident with a side edge portion of the weight-mounting surface, providing an unobstructed area in the widthwise center of the weight-mounting surface for receiving a weight thereon. In addition, according to this aspect of the invention, because the molding seam is coincident with an edge of the weight-mounting surface, burrs formed at the molding seam are less visible.

According to the seventh, eighth and ninth aspects of the invention, the wheel is formed by high pressure die casting, thereby allowing a draft angle of a mold to be decreased. In this manner, the weight-mounting surface can be made more parallel to the rotational center line of the wheel.

According to the tenth aspect of the invention weight-mounting surfaces which are substantially parallel to the rotational center line of the wheel are formed at the center of the inner peripheral surface of the rim in the widthwise direction between adjacent spokes.

A molding seam which is formed at the interface of the split faces of the wheel mold during the molding process is arranged at a position such that an unobstructed area of each weight-mounting surface is provided to receive a weight thereon. In this manner, a portion of the weight-mounting surface for receiving a weight is not influenced by burrs which are liable to be generated at the molding seam, and a flat weight-mounting surface can be formed without cutting, grinding or the like.

Due to such a configuration, the balance weight can be mounted on the weight-mounting surface arranged at the center of the rim in the widthwise direction. In this manner, the balance weight can be mounted at the center of the wheel in the widthwise direction without employing caulking or the like.

According to the eleventh aspect of the invention, the weight-mounting surfaces are formed to be substantially parallel to the rotational center line of the wheel, thereby allowing the balance weights to be maintained in a substantially parallel position with respect to the center line.

According to the twelfth aspect of the invention, the stepped portions project inwardly in the radial direction and weight-mounting surfaces are respectively formed at inner portions of pairs of opposing stepped portions. In this manner, the weight-mounting surfaces can be visually recognized clearly as surfaces offset in a radial direction from the adjacent inner peripheral rim portions, and an operator can easily adhere the balance weight to the center of the wheel in the widthwise direction.

According to the thirteenth aspect of the invention, the weight-mounting surfaces are maintained at an angle with respect to the rotational center line of the wheel such that a draft angle of the mold is provided.

According to the fourteenth aspect of the invention, the weight-mounting surfaces are maintained at an angle set to a range from 0.5° to 3° with respect to the rotational center line of the wheel. In this manner, the weight-mounting surface is formed to be as parallel as possible to the rotational center line of the wheel while still ensuring a sufficient draft angle of the mold.

According to the fifteenth and sixteenth aspects of the invention, because the molding seam is arranged at a position proximate the side edge portion of the weight-mounting surface, the central portion of the weight-mounting surface is not influenced by burrs which are liable to be generated at the molding seam, and a flat weight-mounting surface can be formed without cutting or the like.

According to the seventeenth and eighteenth aspects of the invention, the wheel is formed by high pressure die casting, thereby allowing a draft angle of a mold to be decreased. In this manner, the weight-mounting surface can be made more parallel to the rotational center line of the wheel.

According to the nineteenth aspect of the invention, the plurality of spokes of the wheel are connected to the inner peripheral surface of the rim by connecting portions. Stepped portions project inwardly in a radial direction and inwardly in a widthwise direction from the inner peripheral surface of the rim. Weight-mounting surfaces are formed at the center of the inner peripheral surface of the rim in the widthwise direction, extending between respective pairs of opposing stepped portions.

In this manner, the weight-mounting surfaces can be clearly visually recognized as surfaces offset in a radial direction from the adjacent inner peripheral rim portions, and an operator can easily adhere the balance weight to the center of the wheel in the widthwise direction.

In addition, according to the nineteenth aspect of the invention, the weight-mounting surfaces extend between the opposing stepped portions at an angle D that is set to a range from 0.5° to 3°. In this manner, the weight-mounting surface is formed to be as parallel as possible to the rotational center line of the wheel while still ensuring a sufficient draft angle of the mold.

In addition, according to the nineteenth aspect of the invention, the molding seam formed at an interface between split faces of a wheel mold used to cast the wheel is arranged proximate a side edge portion of the weight-mounting surface, such that an unobstructed area of each weight-mounting surface is provided to receive a weight thereon.

Further, according to the nineteenth aspect of the invention, because the molding seam is arranged at a position spaced away from the center of the weight-mounting surface, the central portion weight-mounting surface is not influenced by burrs which are liable to be generated at the molding seam, and a flat weight-mounting surface can be formed without cutting or the like.

Due to this configuration, the balance weight can be mounted on the weight-mounting surface arranged at the center of the rim in the widthwise direction. In this manner, the balance weight can be mounted at the center of the wheel in the widthwise direction without employing caulking or the like.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENT

Hereinafter, a vehicular wheel according to an illustrative embodiment of the invention is explained in detail, in conjunction with the accompanying drawings.

Figure 1:
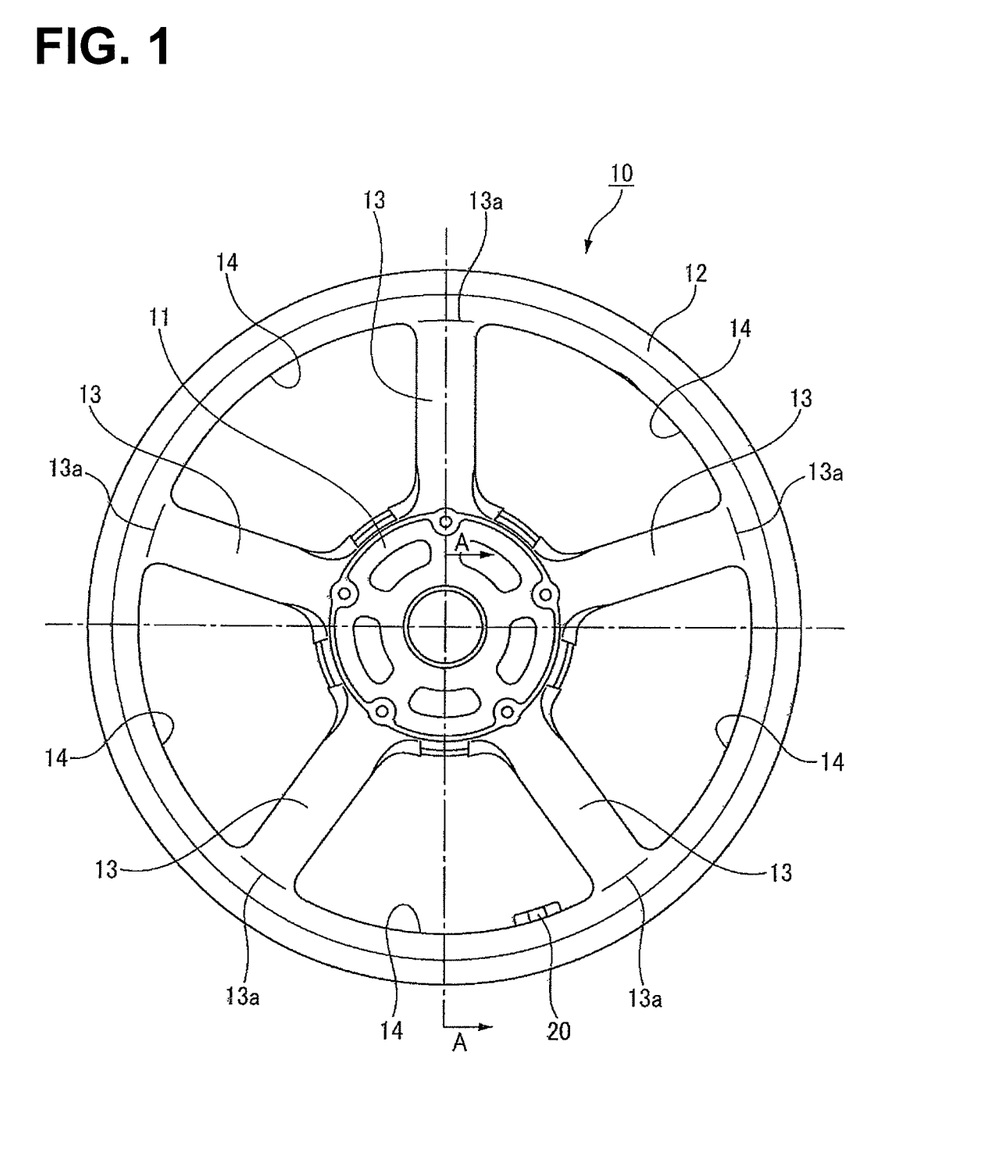
FIG. 1 is a side view showing a vehicle wheel according to an illustrative embodiment of the present invention.
Figure 2:
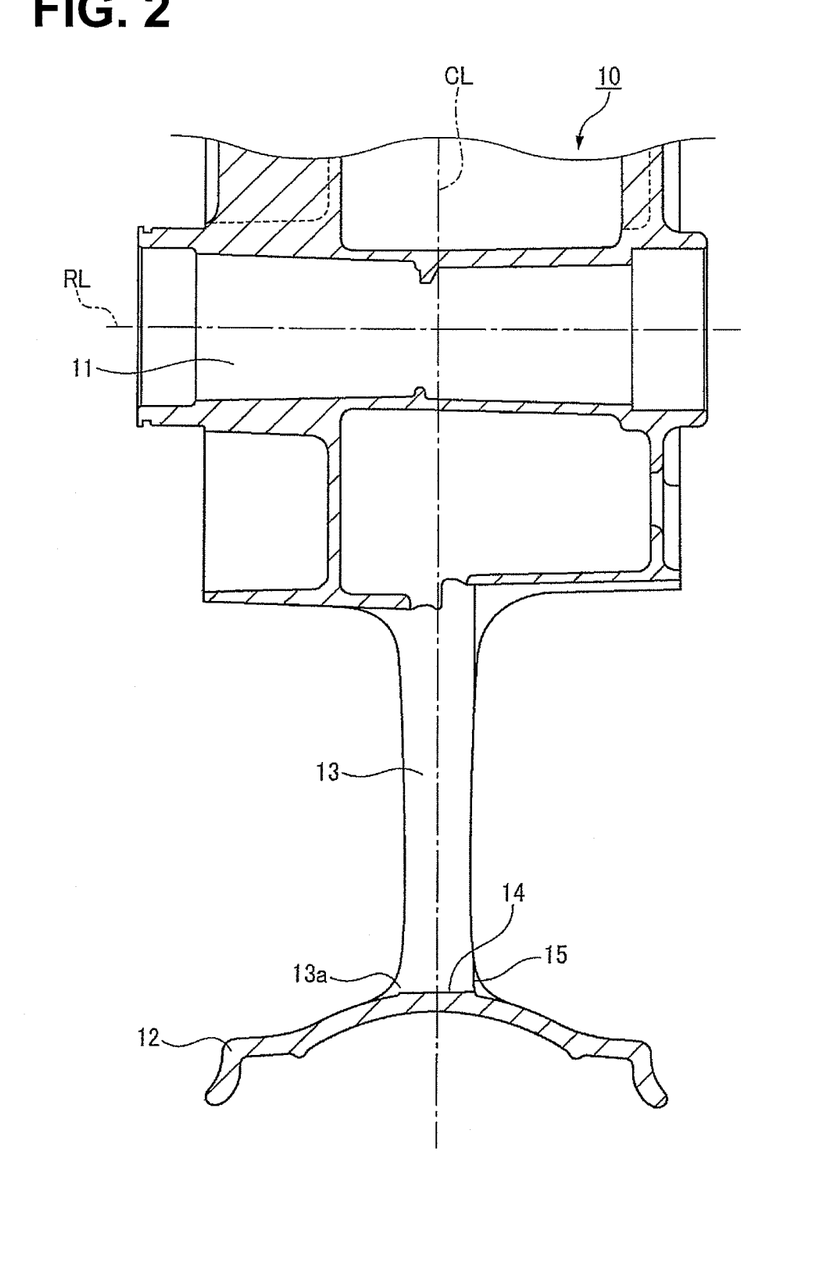
FIG. 2 is a cross-sectional detail view of the wheel of FIG. 1, taken along a line A-A in FIG. 1.

As shown in FIGS. 1-2, a vehicular wheel 10 according to this embodiment includes a hub 11; a rim 12; and a plurality of spokes 13 interconnecting the hub to the rim. The spokes 13 are arranged around the hub spaced apart from one another in the circumferential direction, and extend from the hub 11 toward the rim 12 in a radial direction of the wheel 10. In this embodiment, the hub 11, the rim 12 and the spokes 13 are formed together as parts of an integral body by high pressure die casting (HPDC). In FIG. 2, symbol CL indicates a widthwise center line of the wheel 10 shown in the drawing, the center line passing through a central plane of the wheel 10.

Figure 3:
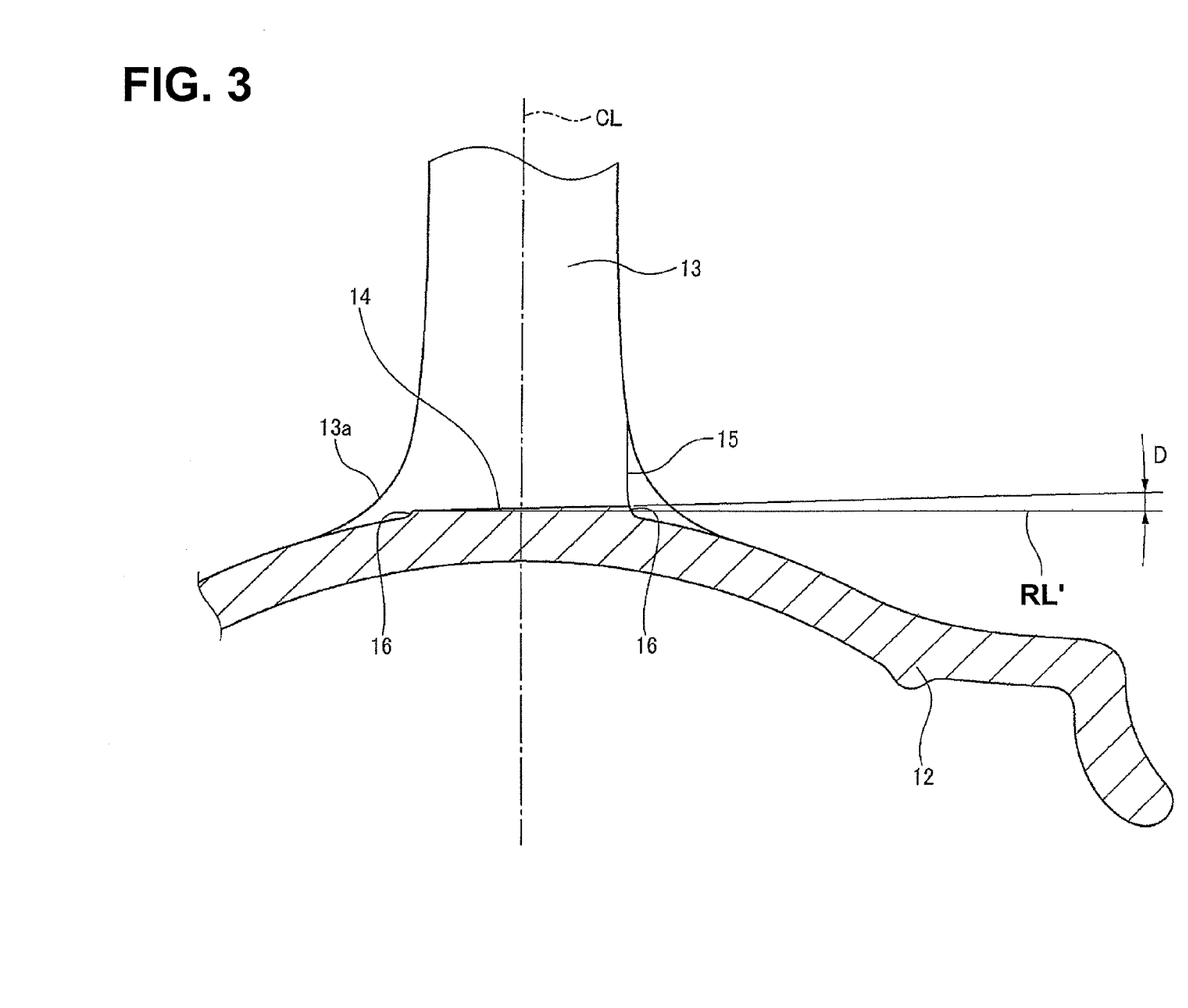
FIG. 3 is an enlarged cross-sectional detail view of a rim of the wheel of FIGS. 1-2, and an area around the rim.

As shown in FIGS. 1-3, the rim 12 includes an inner peripheral portion, including connecting portions 13a and weight-mounting surfaces 14. The spokes 13 are connected to the rim 12 at the respective connecting portions 13a.

Figure 4:
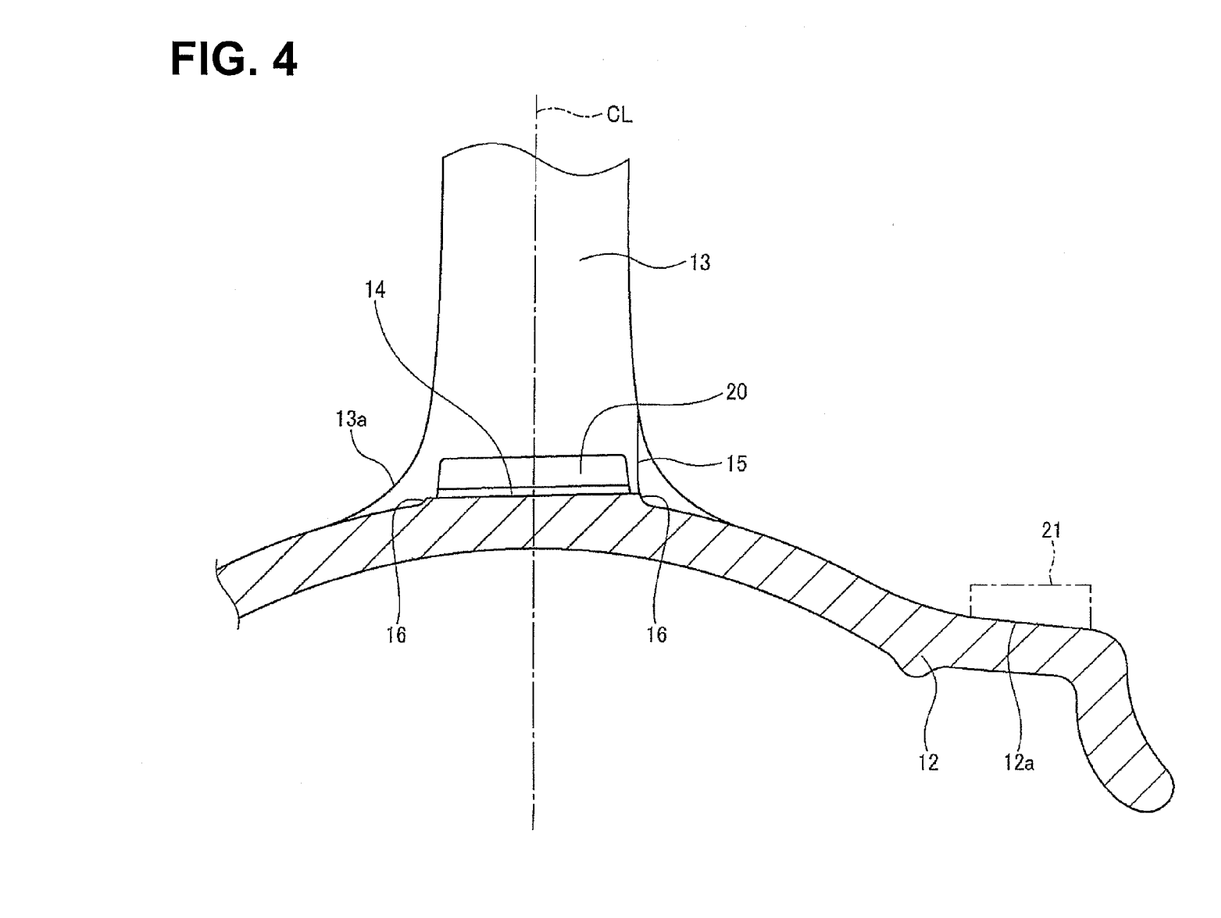
FIG. 4 is an enlarged cross-sectional detail view similar to FIG. 3, also showing a balance weight adhered to a weight-mounting surface of the wheel.

The weight-mounting surfaces 14 are oriented substantially parallel to a rotational center line RL (FIG. 2) of the wheel 10, have two edges, and are formed at a central part of the inner peripheral surface of the rim 12 in the widthwise direction. The weight-mounting surfaces 14 are respectively arranged between two adjacent connecting portions 13a of the spokes 13. As shown in FIG. 4, a balance weight 20 may be adhered to the weight-mounting surface 14 using a double-sided adhesive tape or other suitable adhesive material.

As shown in FIG. 3, the weight-mounting surface 14 is not exactly parallel to the rotational center line RL, but rather, is offset from a line RL' parallel to the rotational center line by an angle D, which is preferably set to a range from 0.5° to 3° with respect to line RL'.

For facilitating the explanation of the invention, the line RL' in FIG. 3 is expressed as a line which is parallel to the actual rotational center line RL shown in FIG. 2, and which intersects one end (left end in FIG. 3) of the weight-mounting surface 14 in the widthwise direction.

As further shown in FIG. 3, a plurality of stepped portions (connecting webs) 16 project inwardly in the radial direction from the rim 12. A weight-mounting surface 14 is formed at inner portions of two opposing stepped portions 16 and extends in the widthwise direction therebetween. A molding seam 15 is formed at an interface between split faces of a wheel mold. The molding seam 15 is arranged at the connecting point between an edge portion of the weight-mounting surface 14 and the stepped portion 16 having a larger size in the radial direction (right stepped portion 16 in FIG. 3). In this manner, the molding seam 15 is arranged at a position spaced away from the center of the weight-mounting surface 14 in the widthwise direction, leaving the remainder of the weight-mounting surface as a smooth, uninterrupted flat area to receive a balance weight 20 thereon. The weight-mounting surface 14 is formed so as not to extend beyond the side edges of the spoke 13 in the widthwise direction, as shown. In other words, the weight-mounting surface 14 is entirely situated between the side edges of the spoke 13 in the widthwise direction.

As described above, according to the vehicle wheel 10 of the depicted embodiment, the weight-mounting surfaces 14 are substantially parallel to the rotational center line RL of the wheel 10 and are formed at the center of the inner peripheral surface of the rim 12 in the widthwise direction. The weight-mounting surfaces 14 are disposed between respective connecting portions 13a. The connecting portions 13a connect the spokes 13 to the rim 12. The molding seam 15 is formed at an interface between split faces of a wheel mold and is arranged at a position spaced away from the center of the weight-mounting surface 14 in the widthwise direction. Due to this arrangement, the balance weight 20 can be adhered to the weight-mounting surface 14 and positioned at the center of the rim 12 in the widthwise direction. Accordingly, the balance weight 20 can be mounted at the center of the wheel 10 in the widthwise direction without employing caulking or the like. Further, the molding seam 15 can be arranged at a position to avoid the weight-mounting surface 14 in the widthwise direction. In this manner the weight-mounting surface 14 is not negatively influenced by burrs which may be generated at the interface of the split faces of a mold and the weight-mounting surface 14 can be formed as a flat surface without the need for cutting and the like.

According to the vehicular wheel 10 of this embodiment, the angle D of the weight-mounting surface 14 is set to a range from 0.5° to 3° with respect to the rotational center line RL of the wheel 10. Accordingly, the weight-mounting surface 14 which is set as parallel as possible to the rotational center line RL of the wheel 10 can be formed while ensuring a draft angle of the mold.

According to the vehicular wheel 10 of this embodiment, stepped portions 16 are formed on both edges of the weight-mounting surface 14 in the widthwise direction. The stepped portions 16 on each of the widthwise sides of the weight-mounting surface 14 provide a visual cue which can be easily recognized, permitting an operator to easily adhere the balance weight 20 to the center of the wheel 10 in the widthwise direction.

Further, according to the vehicular wheel 10 of this embodiment, the molding seam 15 is arranged at the connecting point of the weight-mounting surface and the inner end of the stepped portion 16 and hence, it is possible to reduce the visibility of burrs which may be generated at the split face interface of the mold during the molding process such that the burrs are barely visible.

According to the vehicular wheel 10 of this embodiment, the wheel 10 can be formed by high pressure die casting and thus, a draft angle of a mold can be decreased. Accordingly, the weight-mounting surface 14 can be made more parallel to the rotational center line RL of the wheel 10.

According to the vehicular wheel 10 of this embodiment, as shown in FIG. 4, the balance weight 20 can be adhered to the rim 12 at a position in the vicinity of the center of the rim 12 as opposed to a type of a vehicular wheel where the balance weight 21 is adhered to an edge portion 12a of the rim 12. In this manner, the balance of the wheel 10 can be easily adjusted.

The invention is not limited to the vehicular wheel described in the above-mentioned embodiment, and can be suitably modified without departing from the scope of the invention.

For example, the position of the molding seam 15 is not limited to the connecting point between the edge portion of the weight-mounting surface 14 and the respective stepped portion, and may be set at any desired position provided that the position is spaced away from the center of the weight-mounting surface 14 in the widthwise direction, such that an unobstructed area of the weight-mounting surface 14 is provided sufficient to receive a weight thereon.

DESCRIPTION OF REFERENCE NUMERALS AND SYMBOLS

10: wheel for vehicle
11: hub
12: rim
13: spoke
13a: connecting portion
14: weight-mounting surface
15: molding seam
16: stepped portion
20: balance weight
CL: widthwise center line of wheel
RL: rotational center line of wheel
RL': line parallel to the rotational center line of the wheel and passing through the inner edge of a stepped portion
D: angle of weight-mounting surface

What is claimed is:

1. A vehicular wheel comprising:
   a hub;
   a rim; and
   a plurality of spokes interconnecting the hub and the rim, the spokes extending from the hub toward the rim in the radial direction and arranged around the hub in the circumferential direction;
   the hub, the rim and the spokes being formed as an integral body by casting, wherein:

a plurality of weight-mounting surfaces are formed at the center of an inner peripheral surface of the rim in a widthwise direction of the wheel, each weight-mounting surface being arranged between connecting portions of adjacent spokes where the spokes are connected to the rim, respectively, and a molding seam, formed at an interface between split faces of a wheel mold used to cast the wheel, is spaced away from a central portion of each of the weight-mounting surfaces in the widthwise direction, such that a substantially unobstructed area of each weight-mounting surface is provided to receive a weight thereon, wherein the weight-mounting surface is offset from a rotational center line of the wheel by an angle D which is in a range from 0.5° to 3° with respect to the rotational center line of the wheel, wherein the wheel is formed by high-pressure die casting, and wherein the weight mounting surfaces are disposed circumferentially between connecting portions of adjacent spokes and between inner and outer surfaces of the spokes in the widthwise direction of the rim.

2. The vehicular wheel according to claim 1, wherein the wheel further comprises a plurality of stepped portions disposed around an inner circumference thereof, which project inwardly in the radial direction, and wherein the weight-mounting surfaces are respectively formed extending between inner portions of a pair of opposing stepped portions and extend in the widthwise direction therebetween.

3. The vehicular wheel according to claim 1, wherein the wheel further comprises a plurality of stepped portions disposed around an inner circumference thereof, which project inwardly in the radial direction, and wherein the weight-mounting surfaces are respectively formed extending between inner portions of a pair of opposing stepped portions and extend in the widthwise direction therebetween.

4. The vehicular wheel according to claim 3, wherein the molding seam is arranged proximate a side edge portion of the weight-mounting surface.

5. The vehicular wheel according to claim 3, wherein the molding seam is arranged to be coincident with a side edge portion of the weight-mounting surface.

6. A vehicular wheel comprising:
a hub;
a rim;
and a plurality of spokes interconnecting the hub and the rim, the spokes extending from the hub toward the rim in the radial direction and arranged around the hub in the circumferential direction; the hub, the rim and the plurality of spokes being formed as an integral body by casting, wherein:
weight-mounting surfaces are formed at the center of an inner peripheral surface of the rim in the widthwise direction, and between adjacent spokes, and
a molding seam, formed at an interface between split faces of a wheel mold used to cast the wheel, is arranged at a position such that a substantially unobstructed area of each weight-mounting surface is provided to receive a weight thereon,
wherein the weight-mounting surface is offset from a rotational center line of the wheel by an angle D which is in a range from 0.5° to 3° with respect to the rotational center line of the wheel,
wherein the wheel is formed by high-pressure die casting and
wherein the weight mounting surfaces are disposed circumferentially between connecting portions of adjacent spokes and between inner and outer surfaces of the spokes in the widthwise direction of the rim.

7. The vehicular wheel according to claim 6, wherein:
the inner peripheral surface of the rim includes a plurality of connecting portions where the spokes are connected to the rim, and
the weight-mounting surfaces are substantially parallel to a rotational center line of the wheel, and arranged between the connecting portions.

8. The vehicular wheel according to claim 6, further comprising a plurality of stepped portions, the plurality of stepped portions projecting inwardly in a radial direction from the inner peripheral surface of the rim, wherein the weight-mounting surfaces are respectively formed at inner portions of respective pairs of opposing stepped portions and extend in the widthwise direction therebetween.

9. The vehicular wheel according to claim 8, wherein:
each of the plurality of stepped portions extends widthwise inwardly as it extends radially inwardly, and
one of each pair of opposing stepped portions is longer than the other.

10. The wheel according to claim 6, wherein the molding seam is arranged proximate a side edge portion of the weight-mounting surface.

11. The vehicular wheel according to claim 6, wherein the molding seam is arranged proximate a side edge portion of the weight-mounting surface.

12. A vehicular wheel comprising:
a hub;
a rim having an inner peripheral surface;
a plurality of spokes interconnecting the hub and the rim, the spokes extending from the hub toward the rim in the radial direction and arranged around the hub in the circumferential direction; the hub, the rim and the plurality of spokes being formed as an integral body by casting;
a plurality of connecting portions where the plurality of spokes are respectively connected to the inner peripheral surface of the rim;
a plurality of stepped portions projecting inwardly in a radial direction and inwardly in a widthwise direction from the inner peripheral surface of the rim; and
a plurality of weight-mounting surfaces formed at the center of the inner peripheral surface of the rim in the widthwise direction and extending between respective pairs of opposing stepped portions at an angle D to a rotational center line of the wheel;
wherein:
the angle D is set to a range from 0.5° to 3°, and
a molding seam formed at an interface between split faces of a wheel mold used to cast the wheel is arranged proximate a side edge portion of the weight-mounting surface, such that a substantially unobstructed area of each weight-mounting surface is provided to receive a weight thereon,
wherein the wheel is formed by high-pressure die casting, and
wherein the weight mounting surfaces are disposed circumferentially between connecting portions of adjacent spokes and between inner and outer surfaces of the spokes in the widthwise direction of the rim.

13. The vehicular wheel according to claim 12, wherein the molding seam is arranged to be coincident with a side edge portion of the weight-mounting surface.

\* \* \* \* \*